Figure 3:
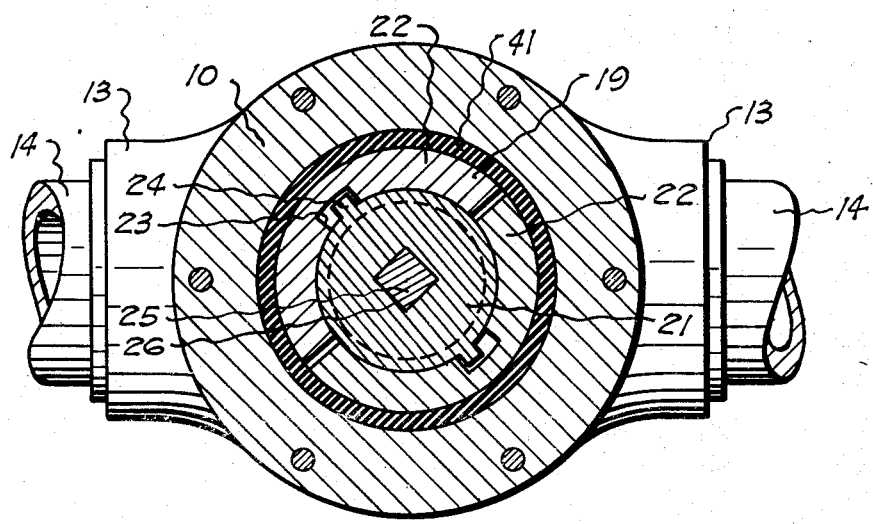

May 29, 1945.　　　C. A. MORGAN　　　2,376,975
VALVE
Filed Feb. 1, 1943　　　2 Sheets-Sheet 1
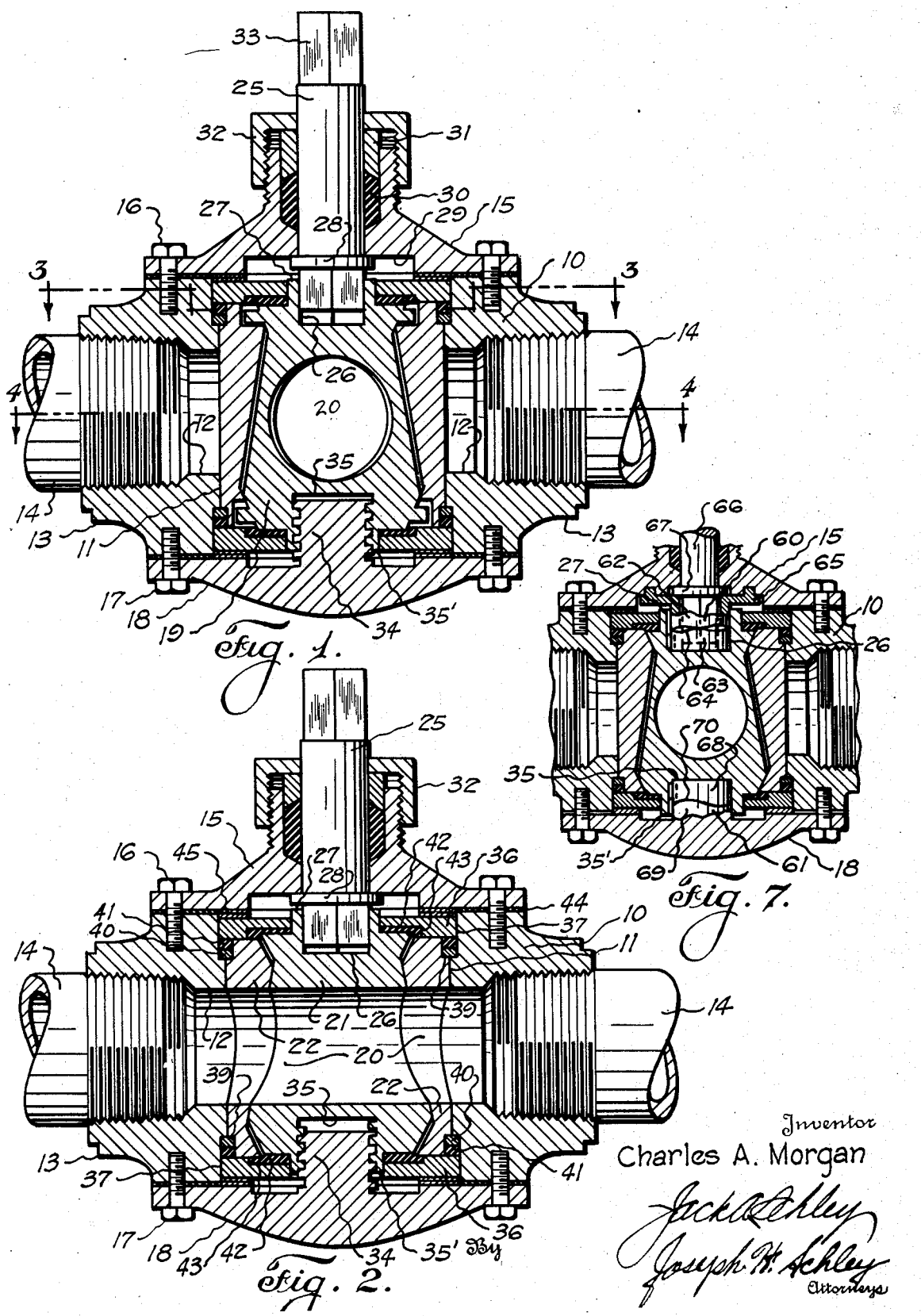
Inventor
Charles A. Morgan
Attorneys May 29, 1945. C. A. MORGAN 2,376,975
VALVE
Filed Feb. 1, 1943 2 Sheets-Sheet 2

Inventor
Charles A. Morgan

By Jack A. Sehley
Joseph H. Sehley
Attorneys

Patented May 29, 1945

2,376,975

UNITED STATES PATENT OFFICE 2,376,975

VALVE

Charles A. Morgan, Plainview, Tex., assignor of one-half to L. B. Newman, Plainview, Tex.

Application February 1, 1943, Serial No. 474,295

13 Claims. (Cl. 251—102)

This invention relates to new and useful improvements in valves.

One object of the invention is to provide an improved valve which is so constructed that it is positively sealed when in either its open or closed position.

An important object of the invention is to provide an improved valve which is particularly adapted to be used in controlling the flow of fluids under high pressure and which includes a rotatable valve element having wedge means associated therewith, whereby the element is tightly wedged and held in its open or closed position to prevent leakage of the valve.

Another object of the invention is to provide an improved high pressure valve, of the character described, wherein the wedge means is relaxed or disengaged during rotation of the valve element, whereby said valve element may be quickly and easily moved from one position to the other.

A further object of the invention is to provide an improved valve having a rotary valve element which includes an actuating core and arcuate segments or gates connected to the core, the segments and core being formed with co-acting wedge surfaces for frictionally locking the same in both their open and closed positions, whereby said segments and core are sealed off from each other and from the valve to prevent leakage thereof.

A particular object of the invention is to provide an improved valve, of the character described, wherein the actuating core is movable a slight distance relative to the segments so as to provide lost-motion therebetween which momentarily delays rotation of said segments by said core and permits disengagement of the wedge surfaces during rotation, thereby minimizing frictional resistance to said rotation.

Still another object of the invention is to provide an improved valve having a separate set of co-acting wedge surfaces for not only frictionally locking but also for positively sealing the valve element in each of its positions, each set of wedge surfaces being disengaged when the other set is in engagement, and said valve element being simultaneously raised or lowered as it rotates from one position to the other to disengage one set of wedge surfaces and engage the other, whereby neither set of wedge surfaces are in engagement during rotation of the element.

A still further object of the invention is to provide an improved valve, of the character described, wherein either the bonnet or the base of the valve may be removed for repairs while the valve element is in either its open or closed position due to the positive locking of said element.

A construction designed to carry out the invention will be hereinafter described, together with other features of the invention.

Figure 4:
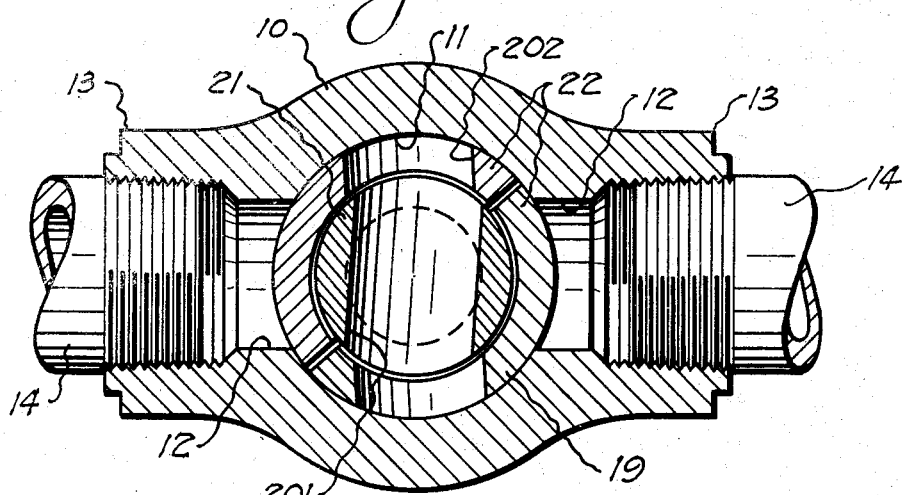
Figure 5:
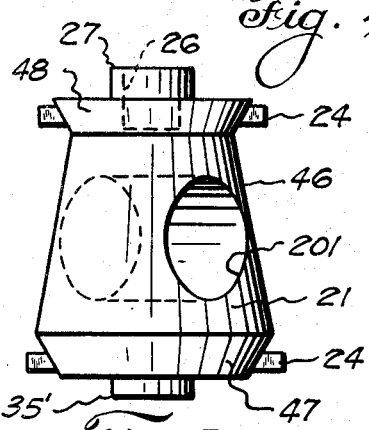
Figure 6:
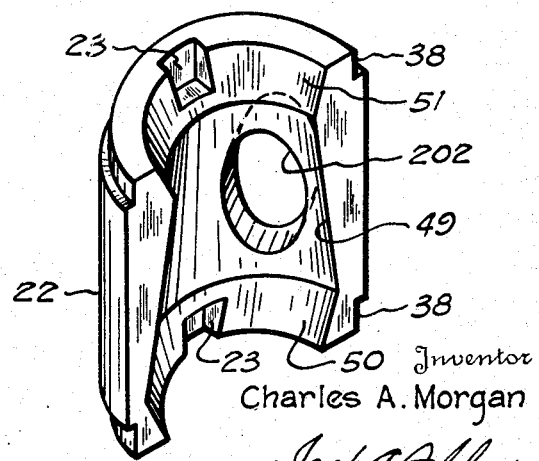

The invention will be more readily understood from a reading of the following specification and by reference to the accompanying drawings, wherein an example of the invention is shown and wherein:

Figure 1 is a transverse, vertical, sectional view of a valve, constructed in accordance with the invention, and shown in its closed position, Figure 2 is a view, similar to Figure 1, showing the valve in its open position, Figure 3 is a horizontal, cross-sectional view, taken on the line 3—3 of Figure 1, Figure 4 is a horizontal, cross-sectional view, taken on the line 4—4 of Figure 1, Figure 5 is a side elevation of the actuating core, Figure 6 is an isometric view of one of the arcuate segments or gates, and Figure 7 is a transverse, vertical, sectional view of a slightly modified form of valve.

In the drawings, the numeral 10 designates a valve body or housing which is generally cylindrical and which has a cylindrical bore 11 extending axially throughout the length thereof. The usual diametrically-opposed flow openings or ports 12 are formed in the wall of the body and communicate with the bore 11. A collar 13, preferably made integral with the body and forming a part thereof, surrounds each port 12 and is internally screw-threaded for receiving a pipe or line 14. For closing the upper end of the bore 11, a flanged closure or bonnet 15 is fastened to the upper surface of said body by a plurality of stud bolts 16. Similar bolts 17 secure a flanged base plate or disk 18 to the bottom of the body so as to close the lower end of the bore.

For controlling the flow through the valve body, a circular valve element 19 is rotatably mounted within the bore 11 and is provided with a transverse, diametrically-extending passage 20 of a diameter substantially equal to the diameter of the ports 12. The valve element 19 includes a central actuating core or member 21, circular in cross-section, and a pair of semi-cylindrical segments or gates 22. As is clearly shown in Figures 3 and 4, the segments 22 surround the core 21 and have their outer surfaces complementary to and in engagement with the wall of the bore 11. The passage 20 extends through the core and both of the segments and when said elements are in the position shown in Figure 2, said passage registers with the ports 12 to provide a continuous opening through the body and thereby permit an uninterrupted flow through the pipe or line 14. Each segment 22 is provided with recesses 23 at the upper and lower ends of its internal surface for receiving radial keys or lugs 24 formed on the upper and lower peripheral portions of the core, whereby rotation of said core will result in rotation of said segments.

For imparting rotation to the core and segments, an operating rod or stem 25 depends axially through the bonnet 15 and has its lower end engaging within a socket or recess 26 formed in the upper end of said core. The socket 26 and the lower end of the stem 25 are angular in cross-section and are complementary to each other, said socket being formed in part by an annular collar 27 which projects upwardly from the top of the core. A radial flange 28 is preferably made integral with the stem immediately above the lower end thereof and is confined within a chamber or recess 29 formed in the lower surface of the bonnet 15, whereby displacement of said stem is prevented. The bore of the bonnet has its upper end enlarged to receive a packing member or ring 30 which surrounds and packs off around the stem 25. For confining the packing member 30 within the bore of the bonnet, a follower ring 31 is disposed within said bore above said member and is engaged by a cap member 32 screw-threaded onto the upper end of said bonnet. The upper end of the stem 25 is also angular in cross-section to provide a plurality of wrench faces 33, whereby said stem may be turned to rotate the core 21 and segments 22.

For raising and lowering the core relative to the segments, as will hereinafter be more fully explained, a screw-threaded stud or pin 34 is preferably made integral with the base plate 18 of the body and projects axially upwardly therefrom into a screw-threaded socket or recess 35 formed in the bottom of said core. An annular collar 35', similar to the collar 27, depends from the core and surrounds the socket 35 so as to form a part thereof. Since the screw-threads of the stud 34 and socket 35 are relatively coarse and are right-hand threads, it is obvious that whenever the core is rotated by turning the stem 25, said core will be raised or lowered a slight distance relative to the segments. A counter-clockwise rotation of the core (Fig. 3) will elevate said core, while rotation in a clockwise or opposite direction will lower the core. Due to the fact that the depth of the recesses 23 of the segments 22 is greater than the height or thickness of the keys 24, vertical movement of the core relative to said segments is permitted. Also, the recesses are of greater width than the coacting keys as shown in Figures 3 and 4 so that the segments will remain stationary during a part of the travel of the core.

The segments and core are confined within the bore 11 of the valve body by upper and lower annular bearings or retaining plates 36 and since the bearings are substantially identical, only the lower one will be described. Each bearing 36 has a greater external diameter than the bore 11 and engages within a recess 37 formed in the body by enlarging the end portion of said bore. The internal diameter of the bearing 36 is substantially equal to the external diameter of the collar 27, or the collar 35', whereby said bearing has a snug sliding fit upon its respective collar. The recess 37 extends vertically inwardly of the bearing 36 and the external peripheral end portion of each segment 22, which end portion engages said bearing, is cut away as shown at 38 to provide with said recess an annular channel 39 between the segments and the body 10 for receiving a metallic sealing ring 40. A similar sealing ring 41, of neoprene, rubber or other suitable material, is confined within the channel 39 between the metallic ring 40 and the bearing 36. Due to the provision of the sealing rings 40 and 41, the space between the segments, the wall of the bore 11 and the bearing 36 is constantly sealed off to prevent fluid from the line 14 from entering the upper or lower portion of the valve body.

For sealing off between the core 21 and each bearing 36, a packing ring 42, of neoprene, rubber or other suitable material, is interposed between said core and bearing and is disposed within a recess 43 formed in the inner transverse or horizontal surface of the bearing at its inner peripheral portion. The internal periphery of the packing ring 42 engages the collar 27 or 35' and has an external diameter slightly greater than the diameter of the core, whereby the external peripheral portion of said ring projects beyond and engages the ends of the segments 22. Thus, the segments tend to hold the ring 42 in place and prevent displacement of the same. The usual gaskets 44, or other suitable sealing means, are confined between the bonnet 15, the base plate 18 and the valve body for packing off therebetween and a laminated, metallic, thrust shim 45 is interposed between each bearing 36 and said bonnet or said base plate, whereby the segments and core of the valve element may be properly alined longitudinally within the bore 11 relative to the ports 12. The shims 45 provide yieldable means for cushioning the movement of the segments and permit longitudinal adjustment of said segments to compensate for wear thereof, as will be hereinafter more fully explained.

As is clearly shown in Figure 5, the external cylindrical surface of the core 21 is tapered or inclined upwardly and inwardly to provide a frusto-conical wedge or bearing surface 46. The lower end of the core is beveled inwardly and downwardly at an angle to the wedge surface 46 to provide an inclined wedge surface 47, while an upwardly and outwardly inclined wedge surface 48 is formed at the upper end of said core above said surface 46. It is preferable that the lugs or keys 24 which coact with the recesses 23 of the segments be made integral with the wedge surfaces 47 and 48. The wedge surfaces of the core are adapted to coact with corresponding or complementary wedge surfaces 49, 50 and 51 formed on the internal, arcuate surface of each segment (Fig. 6). The upwardly and inwardly inclined intermediate wedge surface 49 of each segment coacts with the surface 46 of the core, while the downwardly and inwardly inclined lower surface 50 and the upwardly and outwardly inclined upper surface 51 of said segment are adapted to coact with the upper and lower surfaces 47 and 48, respectively, of said core.

The passage 20 of the valve element 19 extends through the core and each segment at an acute angle relative to the keys 24 and recesses 23 as indicated by the numerals 201 and 202. When the core is in its lower position as shown in Figure 1, the surfaces 50 and 51 are in wedging engagement with the surfaces 47 and 48, respectively, communication through the valve body being shut off due to the passages 201 and 202 being offset relative to the ports 12 (Fig. 4). In this position, the vertical joints or gaps between the segments are preferably disposed at an angle of approximately forty-five (45°) degrees relative to the axis of the ports 12. As is clearly shown in Figure 4, the surfaces 46 and 49 of the core and segments are spaced from each other so as to be disengaged in this position. Also, the keys or lugs 24 of the core are in engagement with the clockwise walls of the recesses 23 (Fig. 3) and the passage 201 of said core is offset in a clockwise direction relative to the passages 202 of said segments. Upon rotation of the core in a counterclockwise direction, said core will be raised by the coaction of the screw-threaded stud 34 and socket 35 so as to move the wedge surfaces 47 and 48 out of engagement with the corresponding surfaces 50 and 51 of the segments. The surface 46 will also momentarily remain out of engagement with the surfaces 49 and continued rotation of the core will result in a counter-clockwise movement of the segments. It is pointed out that due to the greater width of the recesses 23, the keys 24 will move into engagement with the counter-clockwise walls of said recesses upon counter-clockwise movement of the core so as to aline the passages 201 and 202 of said core and segments prior to rotation of the segments. Manifestly, this movement of the core relatively to the segments is necessary in order to release the upper and lower wedge surfaces.

After alinement of the passages 201 and 202 of the core and segments, said core and segments will move as a unit in a counter-clockwise direction through a ninety (90°) degree angle until said passages are alined with the ports 12 of the valve body. During this rotation, the core will be constantly moved upwardly relative to the segments due to the screw-threaded stud 34 and socket 35, thereby moving the intermediate wedge surfaces 46 and 49 toward each other and the other wedge surfaces away from each other. As is clearly shown in Figure 2, the intermediate wedge surfaces are in positive engagement so as to frictionally lock the core and segments in open or communicating position upon completion of the counter-clockwise rotation. When in this position, the segment joints or gaps are again disposed at approximately a forty-five (45°) degree angle relative to the axis of the ports 12, attention being directed to the fact that said gaps or joints have not been moved across said ports because the same have merely been moved from adjacent one port 12 to a position contiguous to the other port.

When it is desired to shut off flow through the valve body, the stem 25 is turned in a clockwise direction so as to rotate the core in such direction. Upon this movement of the core, the keys 24 will be first moved into engagement with the clockwise walls of the recesses 23 and the passage 201 of said core will be clockwise misalined with the passages 202 of the segments. This rotation of the core relative to the segments will also result in downward relative movement of said core, whereby the intermediate wedge surfaces 46 and 49 will be disengaged. Upon the core and segments approaching their original or closed position, the upper and lower wedge surfaces 47 and 48 will commence to move into engagement with the wedge surfaces 50 and 51 and said surfaces will be in positive engagement upon completion of the clockwise rotation. Thus, none of the wedge surfaces are in engagement during the major portion of the rotation of the core and segments from one position to the other and said surfaces move out of and into engagement only upon the initial and ending portions of such rotation.

Attention is directed to the fact that the relative positions of the core and segments as well as the relative movements or timing thereof are controlled by the shims 45. By varying the thickness of the shims, the segments may be adjusted longitudinally with respect to the core, thereby compensating for wear of the wedge surfaces. If the upper and lower wedge surfaces 47, 48, 50 and 51 become worn, the thickness of the lower shim is increased and the upper shim is decreased in thickness. Conversely, an increase in the thickness of the upper shim and a reduction of the lower shim's thickness will compensate for wear of the intermediate wedge surfaces 46 and 49. Due to their yieldability, the shims also cushion the final or ending movement of the segments as the same are rotated from one position to the other, whereby tightening of the engagement of the wedge surfaces is permitted.

From the foregoing, it is manifest that the core and segments of the valve element are positively locked in position by the engagement between their wedge surfaces so that leakage into the body of the valve is prevented. When the valve element is in its closed or non-communicating position, the upper and lower wedge surfaces also serve to seal off the space between the core and segment, while the intermediate wedge surfaces seal off such space when the valve element is in its open or communicating position. Obviously, the external surfaces of the segments are in frictional sealing engagement with the wall of the bore 11 when the valve element is in its open or closed position so as to prevent fluid in the line 14 from flowing into the upper or lower portions of said bore. The upper and lower packing rings 42 likewise constantly function to seal off between the valve element and the thrust bearings or retaining rings 36, while the bore 11 and segments are sealed by the sealing rings 40 and 41. However, the lower packing ring 42 provides a positive seal when the core is in its lower or closed position and the upper packing ring 36 positively seals when the core is in its raised or open position. Manifestly, the bonnet 15 or base plate 16 may be removed during use of the valve for repair purposes due to the frictional locking engagement of the wedge surfaces.

A slightly modified form of valve is shown in Figure 7 and includes upper and lower cam members 60 and 61 instead of the coacting screw-threaded stud 34 and socket 35. The upper socket 26 and collar 27 as well as the lower socket 35 and collar 35' are formed with smooth cylindrical bores for receiving the cam members. The upper cam member 60 includes upper and lower annular cam rings or elements 62 and 63 having complementary contiguous surfaces 64. An annular flange 65 is formed on the upper cam ring 62 and is keyed or otherwise secured to the bonnet 15, whereby said ring is held against rotation. An operating stem 66, similar to the stem 26 and having a similar annular flange 67 formed thereon, extends downwardly through the cam ring 62 and engages within the lower cam ring 63 which is keyed within the socket 27. The portion of the stem below the flange 67 is reduced in diameter and is keyed or otherwise secured to the lower ring 63 so that turning of the stem will rotate said ring. The lower cam member 61 includes a pair of cam blocks 68 and 69, having complementary contiguous surfaces 70, the upper cam block being keyed within the cylindrical socket 35 and the lower cam block being made integral or otherwise secured to the base plate 18. Thus, the upper cam ring 62 and lower cam block 69 remain stationary, while the lower ring 63 and upper block 68 rotate or turn with the stem 66 and valve core 21.

Attention is directed to the fact that the cam surfaces 64 of the upper cam member 60 are offset relative to the cam surfaces 70 of the lower cam member 61, whereby the lobes of the upper cam surfaces will be alined and in engagement with each other when the lobes of the lower cam surfaces are misalined or in a non-operating position. Thus, when the lobes of the cam surfaces 64 are in engagement, the core 21 is forced downwardly and held in its lowermost position with its wedge surfaces 47 and 48 engaging the surfaces 50 and 51, respectively, of the segments. Upon counter-clockwise rotation of the stem 66 and core, the lobes of the lower cam surfaces 70 will be aligned and engaged to force said core upwardly relative to the segments and move the intermediate wedge surface 46 into engagement with the complementary surfaces 49 of said segment. Simultaneously with the alining and engagement of the lower lobes, the lobes of the upper cam surfaces 64 will be misalined and disengaged to permit the upward movement of the core. Manifestly, the cam members 60 and 61 coact to accomplish the same results as the screw-threaded stud 34 and socket 35 of the first form of the invention, because the upper cam member 60 forces the core downwardly and the lower cam member 61 forces said core upwardly.

The foregoing description of the invention is explanatory thereof and various changes in the size, shape and materials, as well as in the details of the illustrated construction, may be made, within the scope of the appended claims, without departing from the spirit of the invention.

What I claim and desire to secure by Letters Patent is:

1. A valve including, a housing having a flow opening and a bore intersecting the opening, a valve element rotatably mounted in the bore and having a passage adapted to be registered with the flow opening to permit a flow therethrough, means carried by and rotatable with the valve element and interposed between said element and bore, the valve element and means having coacting wedge surfaces for positively locking said element and means in registering and non-registering position, and packing means overlying and underlying the valve element and portions of the means carried by said element so as to be interposed between the element, said carried means and the housing for sealing off therebetween.

2. A valve including, a body having a cylindrical bore and diametrically-opposed ports communicating with the bore and adapted to be connected to a flow line, a rotatable cylindrical valve member mounted in the bore, the valve member having a transverse passage adapted to be registered with the ports to permit an unrestricted flow through the flow line, the passage being moved into and out of registration with said ports by rotation of said valve member, means for raising and lowering the valve member upon rotation thereof, wedge means for positively locking said member with its passage in registering and non-registering position, and packing means overlying and underlying the valve member so as to be interposed between said member and the housing for sealing off therebetween, the raising and lowering of the member moving the same into engagement with the packing means for effecting a more positive seal.

3. A valve including, a body having a cylindrical bore and laterally-disposed ports communicating with the bore and adapted to be connected to a flow line, a cylindrical valve element rotatably mounted in the bore and having a transverse passage adapted to be moved into and out of registration with the ports by rotation of the valve element, said element including an actuating core and external segments having connection with the core and engaging the wall of said bore, said core and segments being formed with contiguous angular surfaces which coact with each other to positively lock the valve element in a registering position and in a non-registering position, the core being movable relative to the segments, cam members below said core for elevating the core relative to said segments, and cam members above said core for lowering the same relative to the segments, whereby rotation of the valve element in one direction will elevate the core to engage the angular surfaces and lock said element in one position and rotation of the element in the opposite direction will lower said core to engage said angular surfaces and lock said element in its other position.

4. A valve including, a body having a cylindrical bore and laterally-disposed ports communicating with the bore and adapted to be connected to a flow line, a cylindrical valve element rotatably mounted in the bore and having a transverse passage adapted to be moved into and out of registration with the ports by rotation of the valve element, said element including an actuating core and external segments having connection with the core and engaging the wall of said bore, said core and segments being formed with contiguous angular surfaces which coact with each other to positively lock the valve element in a registering position and in a non-registering position, the core being movable relative to the segments, and means for elevating and lowering said core relative to said segments upon rotation of the valve element, whereby rotation of said element in one direction will elevate the core to engage the angular surfaces and lock the element in position and rotation of said element in the opposite direction will lower said core to engage said angular surfaces and lock the element in its other position, the angular surfaces for locking the valve element in its non-registering position being disposed adjacent each end portion of the core and segments and the angular surfaces for locking said element in registering position being intermediate the other surfaces and surrounding the transverse passage.

5. A valve including, a body having a cylindrical bore and laterally-disposed ports communicating with the bore and adapted to be connected to a flow line, a cylindrical valve element rotatably mounted in the bore and having a transverse passage adapted to be moved into and out of registration with the ports by rotation of the valve element, said element including an actuating core and external segments having connection with the core and engaging the wall of said bore, said core and segments being formed with contiguous angular surfaces which coact with each other to positively lock the valve element in a registering position and in a non-registering position, the core being movable relative to the segments, means for elevating and lowering said core relative to said segments upon rotation of the valve element, whereby rotation of said element in one direction will elevate the core to engage the angular surfaces and lock the element in position and rotation of said element in the opposite direction will lower said core to engage said angular surfaces and lock the element in its other position, and yieldable means associated with the segments for maintaining the same in a fixed position relative to the core, the yieldable means cushioning said segments so as to permit tight engagement of the angular surfaces and positive locking of the valve element in either of its positions.

6. A valve including, a body having a cylindrical bore and laterally-disposed ports communicating with the bore and adapted to be connected to a flow line, a cylindrical valve element rotatably mounted in the bore and having a transverse passage adapted to be moved into and out of registration with the ports by rotation of the valve element, said element including an actuating core and external segments having connection with the core and engaging the wall of said bore, said core and segments being formed with contiguous angular surfaces which coact with each other to positively lock the valve element in a registering position and in a non-registering position, the core being movable relative to the segments, means for elevating and lowering said core relative to said segments upon rotation of the valve element, whereby rotation of said element in one direction will elevate the core to engage the angular surfaces and lock the element in position and rotation of said element in the opposite direction will lower said core to engage said angular surfaces and lock the element in its other position, and means associated with the segments for maintaining the same in a fixed position relative to the core, the means being removable so as to permit replacement of the same and thereby compensate for wear of the angular surfaces of said segments and core.

7. A valve including, a body having a cylindrical bore and laterally-disposed ports communicating with the bore and adapted to be connected to a flow line, a cylindrical valve element rotatably mounted in the bore and having a transverse passage adapted to be moved into and out of registration with the ports by rotation of the valve element, said element including an actuating core and external segments having connection with the core and engaging the wall of said bore, said core and each segment having a single wedge surface which coact with each other to positively lock the valve element in one position and a pair of wedge surfaces for locking said element in its other position, the core being movable relative to the segments, and means for elevating and lowering said core relative to said segments upon rotation of the valve element, whereby rotation of said element in one direction will elevate the core to engage the angular surfaces and lock the element in position and rotation of said element in the opposite direction will lower said core to engage said angular surfaces and lock the element in its other position.

8. A valve in accordance with claim 7 wherein the pair of wedge surfaces are disposed adjacent each end portion of the core and each segment and the single wedge surface is intermediate said pair of surfaces and surrounds the transverse passage of the valve element.

9. A valve including, a body having a cylindrical bore and laterally-disposed ports communicating with the bore and adapted to be connected to a flow line, a cylindrical valve element rotatably mounted in the bore and having a transverse passage adapted to be moved into and out of registration with the ports by rotation of the valve element, said element including an actuating core and external segments having connection with the core and engaging the wall of said bore, said core and segments being formed with contiguous angular surfaces which coact with each other to positively lock the valve element in a registering position and in a non-registering position, the core being movable relative to the segments, and cam means for elevating and lowering said core relative to said segments upon rotation of the valve element, whereby rotation of said element in one direction will elevate the core to engage the angular surfaces and lock the element in position and rotation of said element in the opposite direction will lower said core to engage said angular surfaces and lock the element in its other position, one cam means being disposed above the core and the other cam means being positioned below said core so as to coact in elevating and lowering the core.

10. A valve including, a body having a cylindrical bore and laterally-disposed ports communicating with the bore and adapted to be connected to a flow line, a cylindrical valve element rotatably mounted in the bore and having a transverse passage adapted to be moved into and out of registration with the ports by rotation of the valve element, said element including an actuating core and external segments having connection with the core and engaging the wall of said bore, said core and segments being formed with contiguous angular surfaces which coact with each other to positively lock the valve element in a registering position and in a non-registering position, the core being movable relative to the segments, a plate removably secured to the bottom of the body and closing the lower end of its bore, packing means interposed between the plate and said valve element for sealing off therebetween, and a screw-threaded pin and socket connection between said plate and said core and sealed off from the transverse passage of the valve element for moving the core axially relative to the segments upon rotation of said valve element, whereby rotation of the element in opposite directions will axially move said core to engage the angular surfaces and lock said element in its registering and non-registering positions, the engagement of said angular surfaces and the locking of the element in one of its two positions permitting removal of the plate and replacement of the packing during use of the valve.

11. A valve including, a body having a cylindrical bore and laterally-disposed ports communicating with the bore and adapted to be connected to a flow line, a cylindrical valve element rotatably mounted in the bore and having a transverse passage adapted to be moved into and out of registration with the ports by rotation of the valve element, said element including an actuating core and external segments having connection with core and engaging the wall of said bore, said core and each segment being formed with a single wedge surface which coact with each other to positively lock the valve element in one position and a pair of wedge surfaces for locking said element in its other position upon axial movement of the core relative to the segments, the segments having a loose connection with the core so as to permit axial movement of said core, means for axially moving the core upon initial rotation of the valve element, and means for preventing axial movement of the segments, whereby rotation of said element will initially cause axial movement of said core independent of said segments and thereby disengage the surfaces of the core and segments so as to facilitate rotation of the same.

12. A valve including, a body having a cylindrical bore and laterally-disposed ports communicating with the bore and adapted to be connected to a flow line, a cylindrical valve element rotatably mounted in the bore and having a transverse passage adapted to be moved into and out of registration with the ports by rotation of the valve element, said element including an actuating core and external segments having connection with the core and engaging the wall of said bore, said core and each segment being formed with a single wedge surface which coact with each other to positively lock the valve element in one position and a pair of wedge surfaces for locking said element in its other position upon axial movement of the core relative to the segments, a pin and slot connection between said core and segments for permitting axial movement of the core, means for axially moving the core, upon rotation of the valve element, and means for preventing axial movement of the segments, whereby rotation of said element will initially cause axial movement of said core independent of said segments and thereby disengage the surfaces of the core and segments so as to facilitate rotation of the same.

13. A valve as set forth in claim 7 wherein the single wedge surface of each of the segments and core is substantially conical and is disposed intermediate the pair of wedge surfaces, said latter surfaces being substantially conical and being disposed at inclination to the intermediate conical surface.

CHARLES A. MORGAN.